(12) United States Patent
De Koning et al.

(10) Patent No.: US 12,721,283 B2
(45) Date of Patent: Sep. 1, 2026

(54) PLANT GROWING SYSTEM, PLANT CARRIER AND METHOD OF GROWING VERTICALLY GROWN PLANTS

(71) Applicant: RIDDER HOLDING HARDERWIJK B.V., Harderwijk (NL)

(72) Inventors: Adrianus Noel Maria De Koning, Maasdijk (NL); Wilhelmus Gerardus Hermanus Oltheten, Renkum (NL); Jarl Aron De Bruin, Naaldwijk (NL)

(73) Assignee: RIDDER HOLDING HARDERWIJK B.V., Harderwijk (NL)

( * ) Notice: Subject to any disclaimer, the term of this patent is extended or adjusted under 35 U.S.C. 154(b) by 76 days.

(21) Appl. No.: 18/564,316

(22) PCT Filed: May 24, 2022

(86) PCT No.: PCT/NL2022/050284
§ 371 (c)(1),
(2) Date: Nov. 27, 2023

(87) PCT Pub. No.: WO2022/255863
PCT Pub. Date: Dec. 8, 2022

(65) Prior Publication Data

US 2024/0237588 A1 Jul. 18, 2024

(30) Foreign Application Priority Data

Jun. 1, 2021 (NL) ...................................... 2028358

(51) Int. Cl.
*A01G 9/14* (2006.01)
*A01G 9/02* (2018.01)
*A01G 9/24* (2006.01)

(52) U.S. Cl.
CPC .......... *A01G 9/022* (2013.01); *A01G 9/1476* (2013.01); *A01G 9/24* (2013.01)

(58) Field of Classification Search
CPC .... A01G 9/1476; A01G 31/04; A01G 31/042; A01G 31/045; A01G 9/024; A01G 31/06; A01G 31/047
See application file for complete search history.

(56) References Cited

U.S. PATENT DOCUMENTS 4,476,651 A * 10/1984 Drury ................. A01G 31/042 47/65
10,112,814 B1 * 10/2018 Shelor .................... A01G 22/00
(Continued)

FOREIGN PATENT DOCUMENTS

EP 1763989 3/2007
GB 2077082 12/1981
(Continued)

OTHER PUBLICATIONS

International Search Report and Written Opinion in International Application No. PCT/NL2022/050284, dated Sep. 5, 2022, 14 pages.

*Primary Examiner* — Kristen C Hayes
(74) *Attorney, Agent, or Firm* — KDW Firm PLLC

(57) ABSTRACT

A plant growing system—for growing vertically grown plants, particularly of the fruit bearing type. The system includes at least one track having at least two guides extending substantially parallel at a distance from each other, and a plurality of plant carriers each comprising a gutter for holding plants. The plant carriers extend transversally with respect to the track and are movable along the track. The plant carriers are suspended from the track. A plant carrier used in such a system. A method of growing vertically grown plants, in particular of the fruit bearing type, includes providing plants in gutters of plant carriers and moving the plant carriers along at least one track while suspending the plant carriers from the at least one track.

18 Claims, 8 Drawing Sheets

(56) References Cited

U.S. PATENT DOCUMENTS

Figure 1:
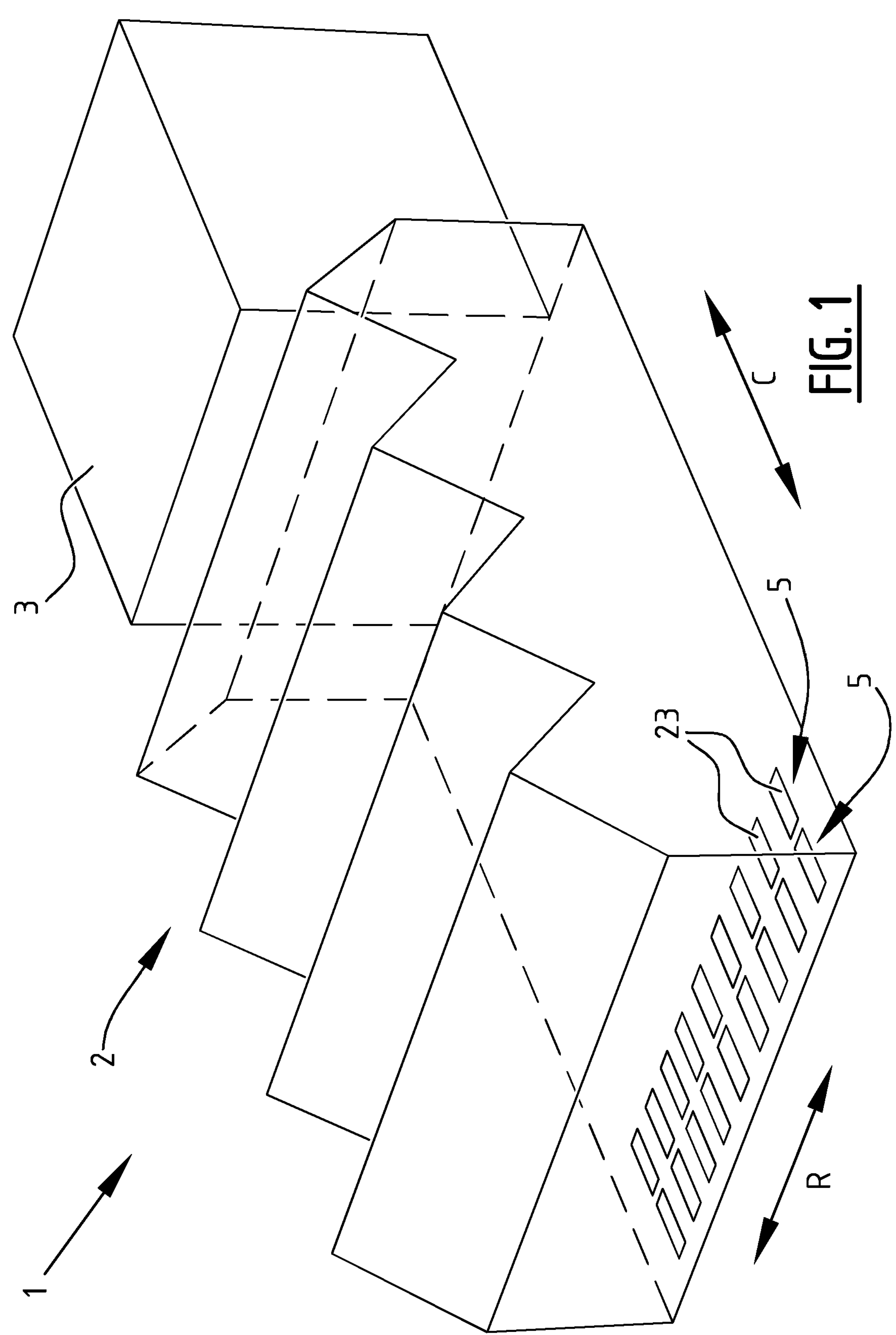

| | | | | |
|---|---|---|---|---|
| 11,224,175 | B1 * | 1/2022 | Parrish | A01G 31/04 |
| 12,245,556 | B1 * | 3/2025 | Camarena | A01G 31/045 |
| 2013/0305601 | A1 * | 11/2013 | Park | A01G 9/14 47/17 |
| 2016/0165810 | A1 * | 6/2016 | Johansson | A01G 31/042 47/65 |
| 2019/0141921 | A1 * | 5/2019 | Tempany | A01G 27/006 47/62 R |
| 2022/0117179 | A1 * | 4/2022 | Vanacore | A01G 31/042 |
| 2023/0363326 | A1 * | 11/2023 | Hennayaka | A01G 31/04 |
| 2024/0407313 | A1 * | 12/2024 | Lonergan | A01G 31/06 |

FOREIGN PATENT DOCUMENTS

| | | |
|---|---|---|
| NL | 1027366 | 5/2006 |
| WO | 2019/182448 | 9/2019 |

* cited by examiner 127
133
122
132
129
130
134
123
136
135
131
130
124
128
129
121
132
127
R
133
C 229
232
230
240
235
231
230
228
223
229
240
232

229
232
228
230
240
240
231
231
235
231
230
241
240
223
229
232

PLANT GROWING SYSTEM, PLANT CARRIER AND METHOD OF GROWING VERTICALLY GROWN PLANTS

This application is a national stage filing under 35 U.S.C. 371 of pending International Application No. PCT/NL2022/050284, filed May 24, 2022, which claims priority to Netherlands patent application 2028358, filed Jun. 1, 2021, the entirety of which applications are incorporated by reference herein.

The invention relates to a plant growing system, in particular for growing vertically grown plants, particularly of the fruit bearing type.

Currently, some vertically grown plants, such as tomatoes, are grown using a wire system arranged in a greenhouse for supporting the plant. The bottom of the plant, including its roots, are kept stationary while a vertical part of the plant is lowered and moved sideways when the plant has grown. The vertical part of the plant is supported by e.g. wiring or ropes, thereby providing adequate support as the plant grows vertically. Fruits of the plant, for example tomatoes, are picked by workers moving through the greenhouse. Other operations to be performed on the plant, such as leaf picking, pruning, monitoring, etc. are also performed in the greenhouse.

Some other plants, for instance lettuce, may be grown using a system of gutters each supporting multiple plants. The gutters can be moved through the greenhouse as desired. Usually, the gutters are supported on a transport system.

In general, there is a desire to reduce the amount of workers needed inside the greenhouse. Firstly, available workers are becoming scarce, and secondly they may be a source of contamination for the plants. Moreover, it is advantageous to expose plants to climate conditions tailored specifically to their stage of growth. It is therefore desirable to provide a plant growing system with movable plant carriers. The known system of gutters is expected to be unsuitable for use in e.g. vertically grown plants, since it offers insufficient support for such plants, due to their nature of growing upwards.

The invention therefore has as its object to provide a plant growing system with movable plant carriers that allows growing e.g. vertically grown plants. In particular, the plant growing system may be used for plants of the fruit bearing type.

The object is achieved by a plant growing system comprising at least one track, comprising at least two guides extending substantially parallel at a distance from each other, and a plurality of plant carriers, each comprising a gutter for holding plants, the plant carriers extending transversally with respect to the track, the plant carriers being movable along the track, wherein the plant carriers are suspended from the track.

By suspending the plant carriers from the tracks, the carriers be placed below the tracks. A center of gravity of the carriers may accordingly be placed relatively low, thereby increasing the stability of the carriers. The increased stability herein results in the carriers being more likely to stay upright under the influence of disturbances. The increased stability is of particular important for vertically grown plants, and even more so in the case of fruit bearing plants, as such plants could otherwise cause the carrier to topple over due to their relatively high center of gravity.

The same principle could be useful for plants with a relatively high center of gravity, such as cannabis, etc. or fruit bearing plants such as strawberry, etc.

The gutters may extend substantially horizontally. Independent thereof, the track(s) may extend substantially horizontally.

In particular, the gutters may extend at a distance below the track. The distance may increase the stability of the carriers as a whole. Theoretically, the distance may be chosen so that the center of gravity of the carrier with a fully grown plants, possibly bearing fruit, is lower than the tracks. In practice, the distance between the gutter and the track therefore varies based on the species of plant grown. In general, a distance of between 0.6 and 1.5 m is envisioned, more in particular of between 0.8 and 1.2 m.

Each plant carrier may further comprise, on or near either end thereof, a rigid suspension element, such as a bracket or hook, for suspending the gutter from a respective one of the at least two guides. Using such a rigid suspension element, the gutter may be suspended below the track relatively stably.

Each plant carrier may additionally comprise one or more diagonal braces, such as metal wires or cables, extending between a respective free end zone of the rigid suspension element and a central zone of the gutter. Such diagonal braces increase the stiffness of the plant carrier, and may aid in at least partly preventing sagging of the gutter.

In particular, one or more diagonal braces may extend along opposite long sides of each plant carrier. By arranging diagonal braces on either side, a twisting deformation of the gutter or carrier is mitigated.

Practically, two separate diagonal braces may be provided on either or both long sides of the carrier. Each brace may thus extend from the middle of the carrier to one of its longitudinal ends. Alternatively, a single brace may be used, e.g. running from the middle to one longitudinal end, or running between both longitudinal ends via the middle. Other configurations for arranging the diagonal brace(s) are possible.

In an embodiment of the plant growing system, each carrier further comprises one or more supports which extend between the two rigid suspension elements above the gutter, preferably at mutually different heights.

Such supports may be used to keep vertically grown plants upright. The plants may e.g. attach themselves naturally to the supports, may be intertwined therewith, or may be connected thereto manually. Supports at different heights allow plants of different heights to be suitably supported. For plants requiring minimal support, a single or no support may suffice.

Adding a minimal amount of weight, the supports may comprise wires, cables or threads. However, it is also possible to form the supports from constructional elements that, besides supporting plants, further contribute to the structural rigidity of the plant carriers.

The supports may extend parallel to each other and to the gutter. As such, in use the supports may extend horizontally. The supports may be kept upright and/or in place by additional frame parts, such as legs extending from the gutter and/or from other supports.

The distance between consecutive supports may be chosen as is suitable for the type of plant to be grown. In particular, a distance of between 20-30 cm has proven advantageous.

In another embodiment of the plant growing system, the gutter of each plant carrier comprises a water inlet near one or both of its longitudinal ends. Accordingly, water may be inserted into the gutter via the inlet. As such, the plants may be grown hydroponically. Of course, where water is supplied, plant feed may also be supplied in or with the water.

To facilitate providing water to the gutters, at least one longitudinal end of each gutter may extend beyond a guide of the at least one track as seen in a transversal direction of said at least one track.

It is however also possible to provide a corresponding suspension element at a, possibly relatively small, distance from at least one longitudinal end of the gutter, thereby causing the gutter, at said at least one longitudinal end, to extend beyond said suspension element. More specifically, the gutter may extend beyond a point where which the corresponding suspension element engages the gutter. Said suspension element may be a rigid suspension element. The extending part of the gutter can accordingly be used to let in water. This configuration allows arranging a water supply below the guide of the track.

Accordingly, the gutters may be provided with water relatively easily. In particular, a stationary water supply point, e.g. a tap or other water outlet, may be arranged above the gutters. The gutters may then be moved along the track until their respective inlets are below the water supply point.

It should therefore be noted that a point on which suspension elements—be they rigid or not—engage on the gutter, need not be arranged on the longitudinal ends of the gutter. In fact, suspension elements may engage a certain distance, for instance maximally 25% of the length of the gutter, towards the middle of the gutter to reduce sagging of the gutter. Nevertheless, it is envisioned the gutter is suspended from near its longitudinal ends, leaving practically only the water inlet(s).

In yet another embodiment of the plant growing system, the gutter of each plant carrier comprises a lid substantially closing the gutter, the lid being provided with through holes along its length. Of course multiple lids may be used for one gutter, in stead of a single lid.

Providing the gutter with a lid has several advantageous. Firstly, the plants may extend through the through holes, which accordingly may serve to keep the plants in place, e.g. at a distance from each other. Secondly, substantially closing the gutter's top with a lid may prevent or reduce the growth of algae, the collection of dust and dirt and the vaporization of water. More importantly, the lid may serve to keep the space defined by the gutter dark, which may suit the development of roots.

In case the gutters comprise a lid, the water inlet may be formed by the gutter extending further than the lid, i.e. the lid leaving free a portion of the gutter near or at its longitudinal end or ends.

It is noted that even without the use of a lid, the gutters may be provided with spacers for keeping a mutual distance between plants in a single gutter.

Of course in any case, the gutter may be closed on one or both of its longitudinal ends.

To let water out, the gutter of each plant carrier may comprise at least one water outlet in a central zone as seen along its length.

Placing the outlet in a central zone allows water drainage from the center. The central position naturally forms a lowest point to which water will flow unassisted, due to the sagging of the gutter. It is noted that regardless of measures aimed at preventing sagging, it is expected that some sagging of the gutter remains so that water may still flow to the center.

When draining from the center, it is advantageous to provide water from both longitudinal ends of the gutter. As compared to a system in which water is fed from one longitudinal end, and drained from the other, the amount of water is more evenly distributed amongst the plants along the length of the gutter.

In yet another embodiment of the plant growing system, the system further comprises several such tracks arranged in parallel. Several tracks may be used to suspend even more carriers from. Arranging the tracks in parallel allows efficiently using space inside the greenhouse.

The plant growing system may additionally comprise a track switching system for moving plant carriers from one track to another.

By switching the carriers from one track to another, plants in certain phases of growth may be kept together. Moreover, plants requiring attention may be moved elsewhere so that the remaining plants run no risk of contamination from workers moving into the greenhouse for providing plant care.

The plant switching system may be automated, thereby avoiding the need for humans to enter the greenhouse for switching the plant carriers. Accordingly, contamination risks are reduced.

The plant growing system may comprise a climate control system, said climate control system being configured to provide a first controlled climate along a first track, and a different, second controlled climate along the second track.

By controlling different climates at different tracks, the plants in carriers along the tracks may be subjected to a climate that is optimal for their current stage of growth. Once said stage is (almost) over, the plants may be moved to another track, e.g. in another now more optimal climate.

Of course the climate control system may be part of an indoor growing environment, such as a greenhouse, and the plant growing system may be arranged inside said indoor growing environment, thereby making use of the climate control system. As such, the climate control system need not necessarily be part of the plant growing system.

First and second are herein used merely to distinguish between different objects. Unless specifically excluded, there may be one or more of a first, a second, a third, etc. of something.

The plant growing system may comprise a crop handling area and a growing area, wherein at least one track is arranged in the crop handling area and at least one track is arranged in the growing area. Accordingly, plants in carriers can be moved from the growing area to the crop handling area when they require attention of e.g. workers, or when specific operations are to be performed on them e.g. manually by workers or automatically by robots.

Such operations may include any or more of the following, which are given as a non-exhaustive list of examples: pruning, leaf picking, connecting the plant to supports, harvesting, crop protection, crop monitoring, etc. It is especially advantageous to perform particular operations, such as crop monitoring in a dedicate space, so that the environment in which the monitoring does not change. Accordingly, performing such operations, e.g. crop monitoring, may be automated relatively easily, e.g. using computer vision. It is expected the relevance of automating operations will be increasingly important in the future.

The plant growing system may be an indoor plant growing system, preferably a greenhouse plant growing system. Accordingly, the plant growing system may be placed inside an indoor facility, e.g. inside a greenhouse.

In yet another embodiment of the plant growing system, it further comprises drive means for driving the plant carriers along the at least one track. The carriers may be moved using the drive means as desired, for instance at a constant but slow pace, or in specific intervals. Accordingly, the movement speed of the plant carriers may be adjusted so that the plant retain in a dedicated growing space in accordance with the duration of a growth face in which said dedicated growing space is optimal for the plants.

The drive means may be configured for changing the distance between consecutive plant carriers. By changing the distance between the carriers, plants in the carriers may be given a suitable amount of space for growing. In particular, the mutual distance between carriers may be increased as the plants grow, so that the plants always have no more than the optimal amount of space available.

The invention also relates to a plant carrier suitable for use in a plant growing system according to any of the preceding claims. Such a plant carriers may have the above-described features, alone or in any suitable combination.

The invention also relates to a method of growing vertically grown plants, in particular of the fruit bearing type, comprising:

a) providing plants in gutters of plant carriers: and b) moving the plant carriers along at least one track, wherein step b) comprises suspending the plant carriers from the at least one track.

As described above, suspending the plant carriers from the at least one track increases the stability of the plant carriers, thereby allowing the use of gutters to grow vertically grown plants. In particular, the gutters of the plant carriers may be suspended below the at least one track, e.g. so that a center of gravity of the plant carriers with the plants therein is lower than the at least one track.

The method may be performed using a plant growing system as described herein. As such, all features described above with respect to the plant growing system also apply mutatis mutandis to the method described herein, and vice versa.

The enumeration of method steps merely serves to distinguish between the steps, and does not imply any order. In fact, the method steps may be performed in any suitable order, in the order listed, and/or some or all method steps may be performed simultaneously. Further, the presence of an exemplary method step enumerated “z” does not imply all previously enumerated method steps (“a” to “y”) are essential. In fact, suitable combinations between the method steps can be made as described below and in the claims.

In an embodiment of the method, the method comprises the steps of:

c) growing the plants in a growing area, and d) performing operations, preferably exclusively, in a crop handling area.

Making a distinction between a growing area and a handling area reduces the probability of workers contaminating the plants in the growing area. The plants may be moved to the crop handling area in their plant carriers. As a result, the workers may be able to work more efficiently. Additionally or alternatively, the environment in the crop handling area may be more suitable for automation.

The method may further comprise the step of:

e) circulating the plant carriers between the growing area and the crop handling area.

By circulating the plant carriers, several operations may be performed on the plants in the handling area, whilst the plants are subjected to particular conditions for growing in the growing area.

In another embodiment of the method, the method further comprises:

f) providing several such tracks with gutters with plants: and g) controlling the climate differently from one track to another.

By providing a different climate at different tracks, optimal conditions can be provided for plants during different stages of their growth. The plants can be placed in carriers and moved to a corresponding track in order to guarantee proper conditions for each plant.

The method may comprise a step of:

h) changing a distance between consecutive plant carriers.

Changing the distance between plant carriers, in particular increasing the distance, allows giving a plant more space as its grows. Accordingly, a space may be used efficiently while plants are given sufficient space for growth.

The method may comprise a step of:

i) watering the plants by supplying water to the gutters at or near one or both of its longitudinal ends, and/or j) draining water at or near a central zone of each gutter.

Watering from the sides and draining in a center may offer the advantages described above in relation to the corresponding system features.

The method is in particular a method for growing vertically grown plants, particularly of the fruit bearing type, such as tomato or pepper. Other plants that may be grown according to the method described herein are e.g. cannabis and strawberry.

Figure 2A:
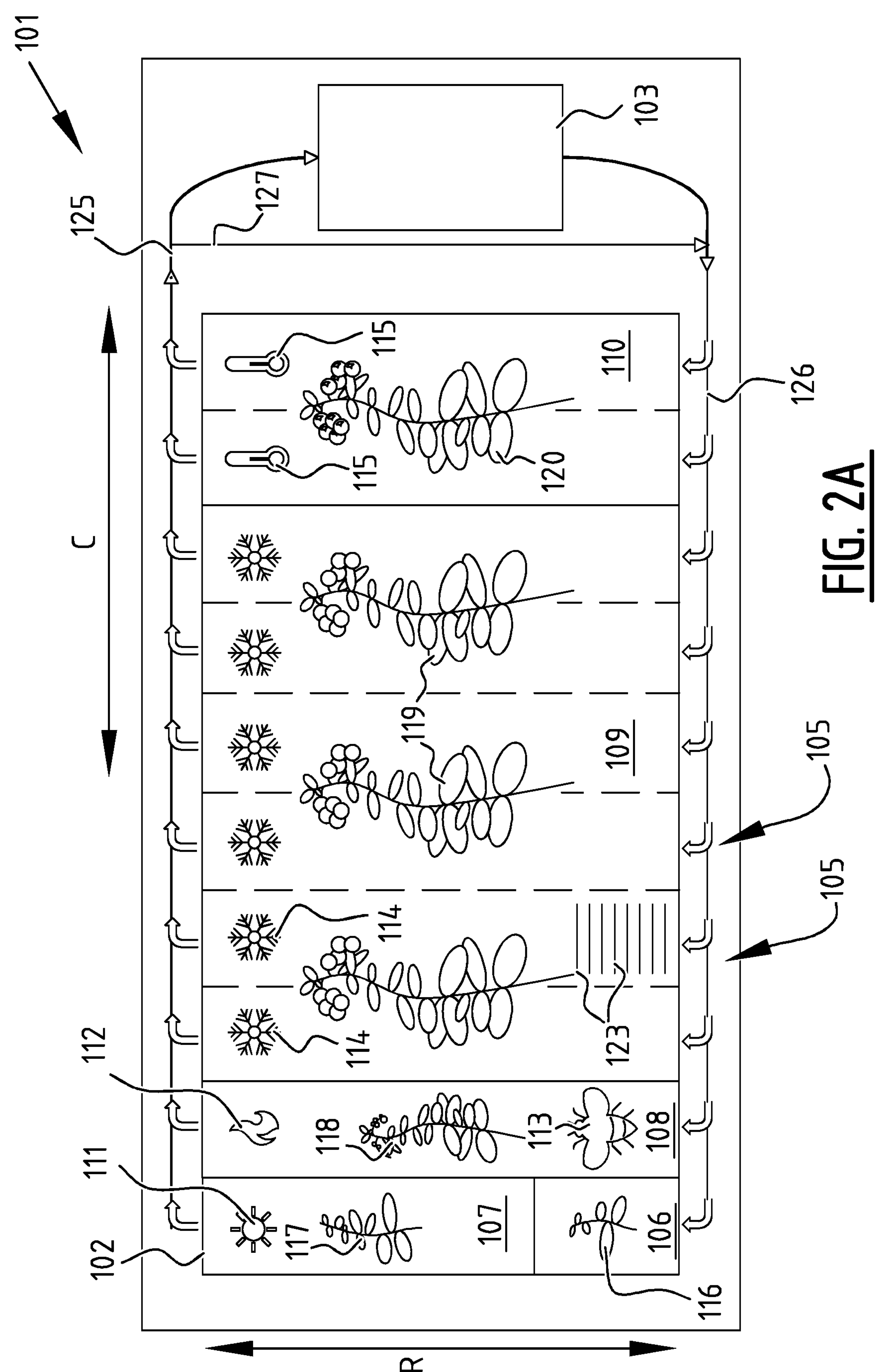
Figure 2B:
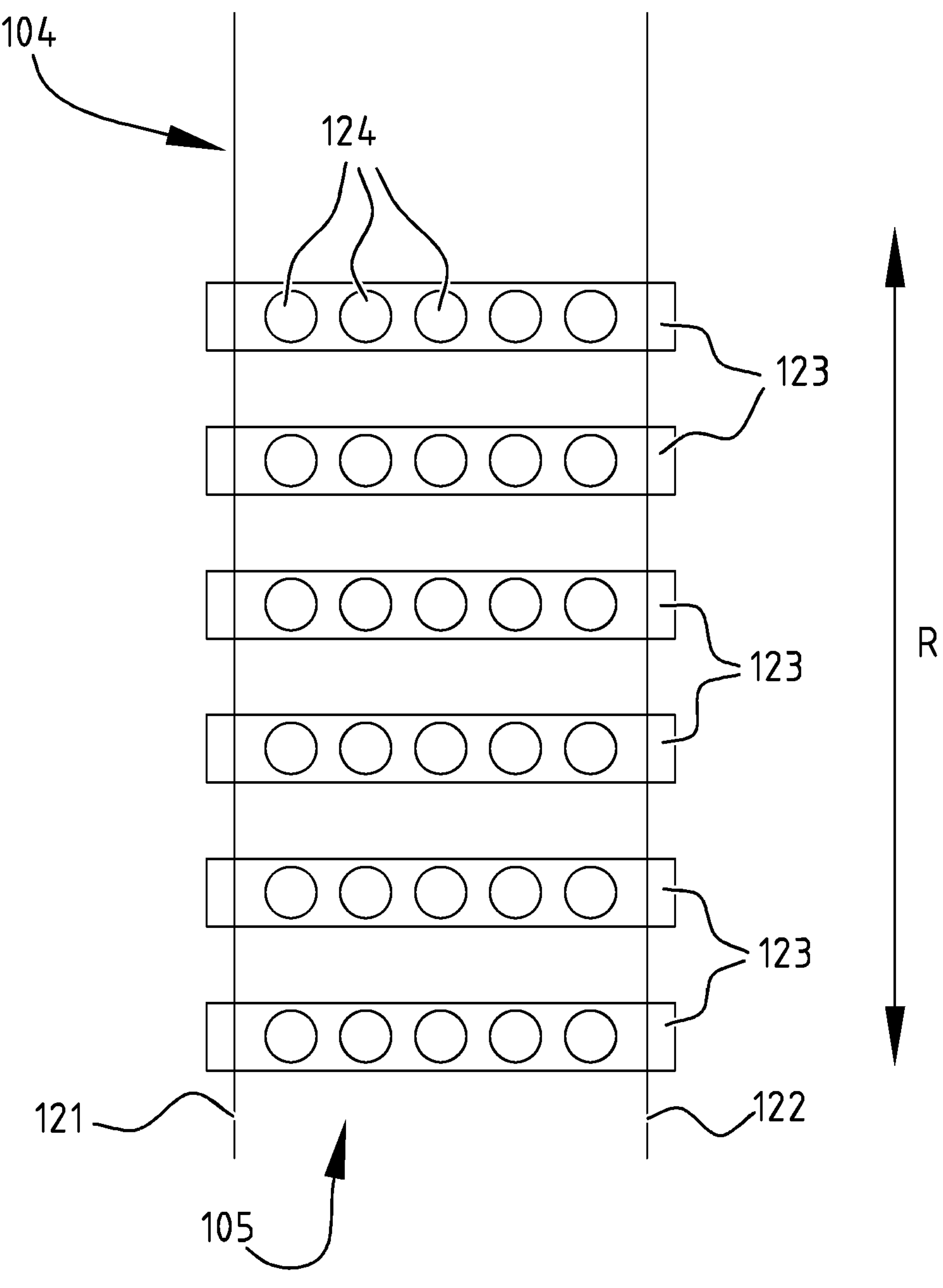
Figure 2C:
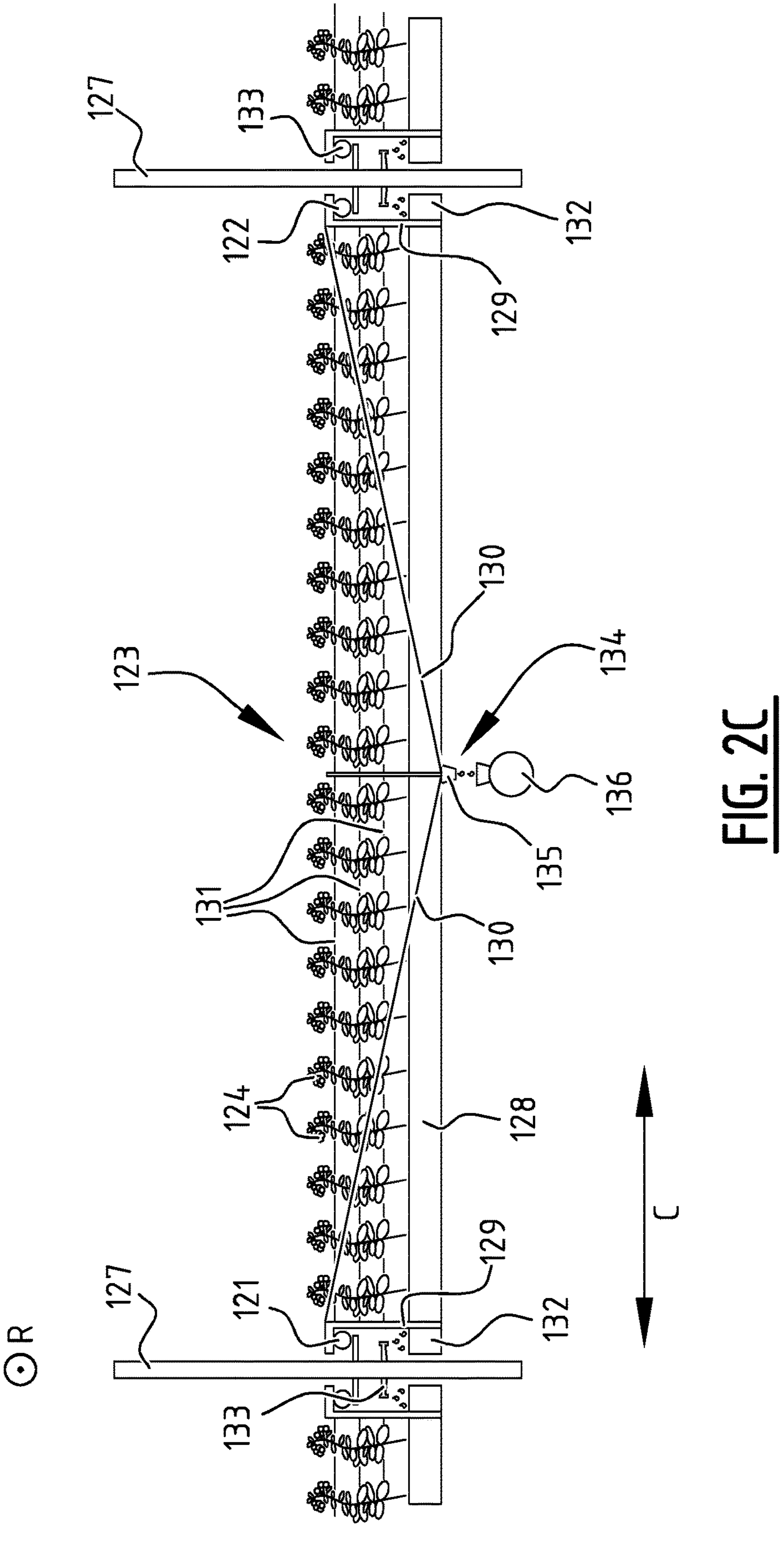
Figure 2D:
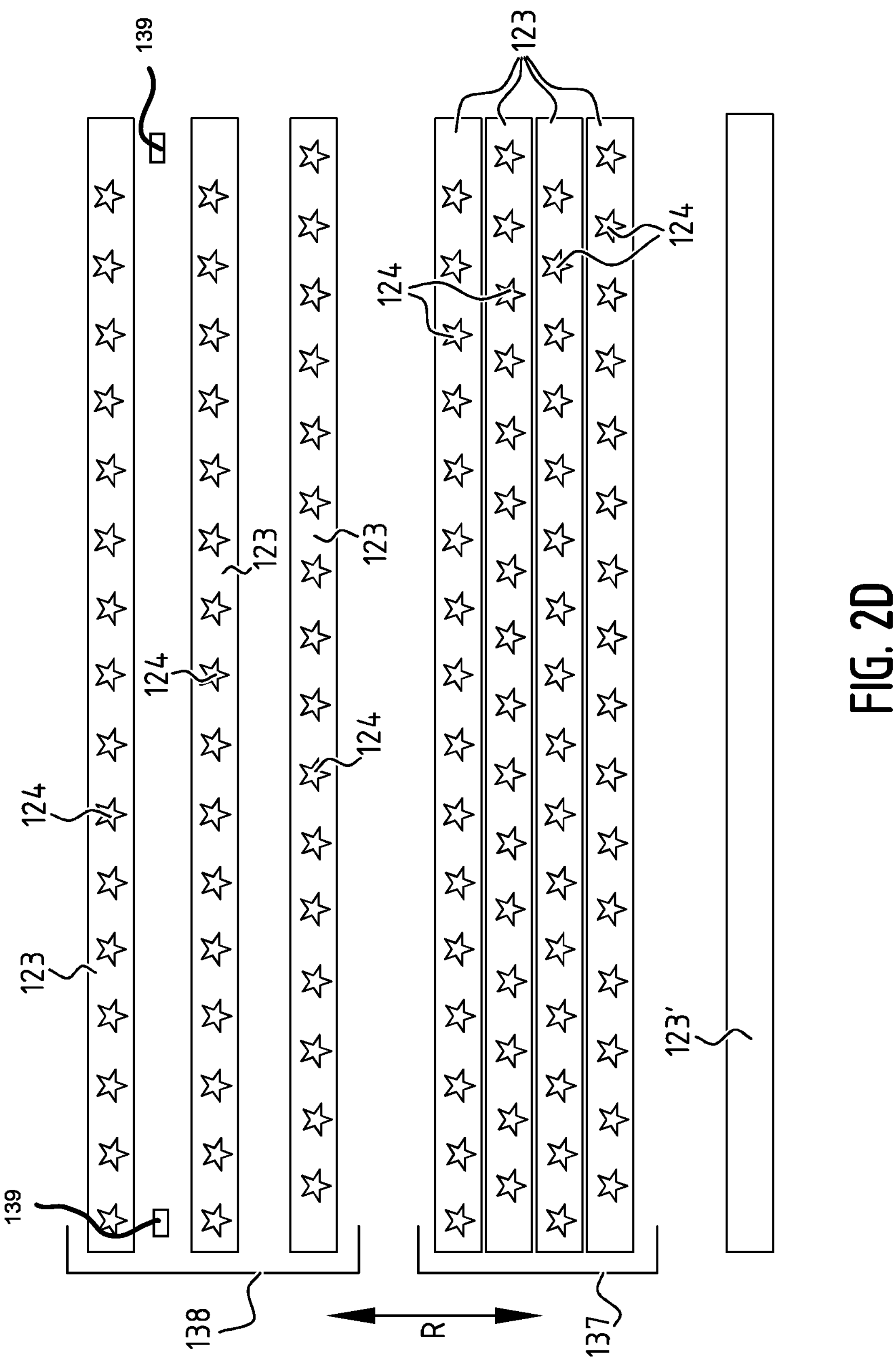
Figure 3A:
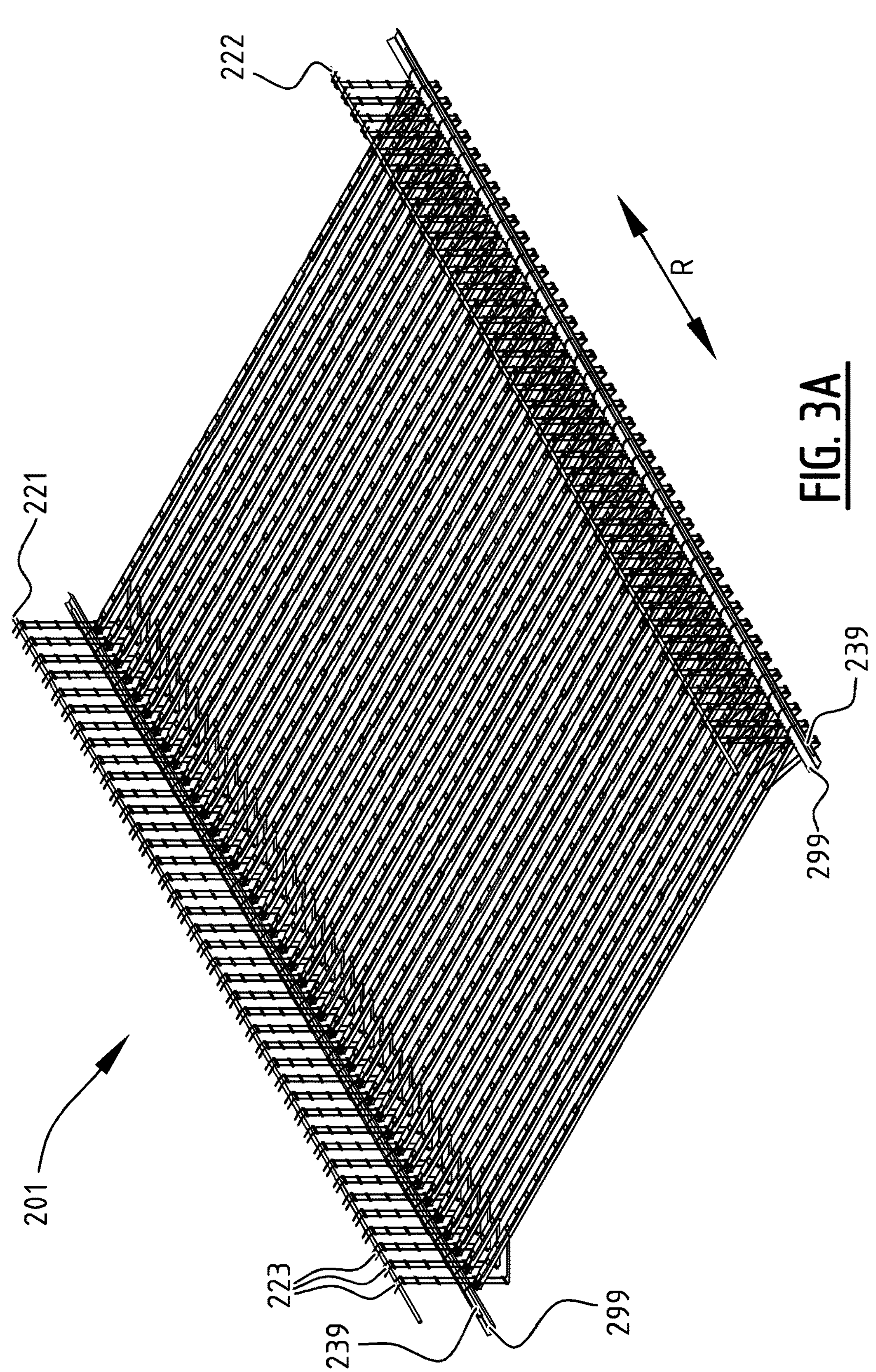
Figures 3B, 3C:
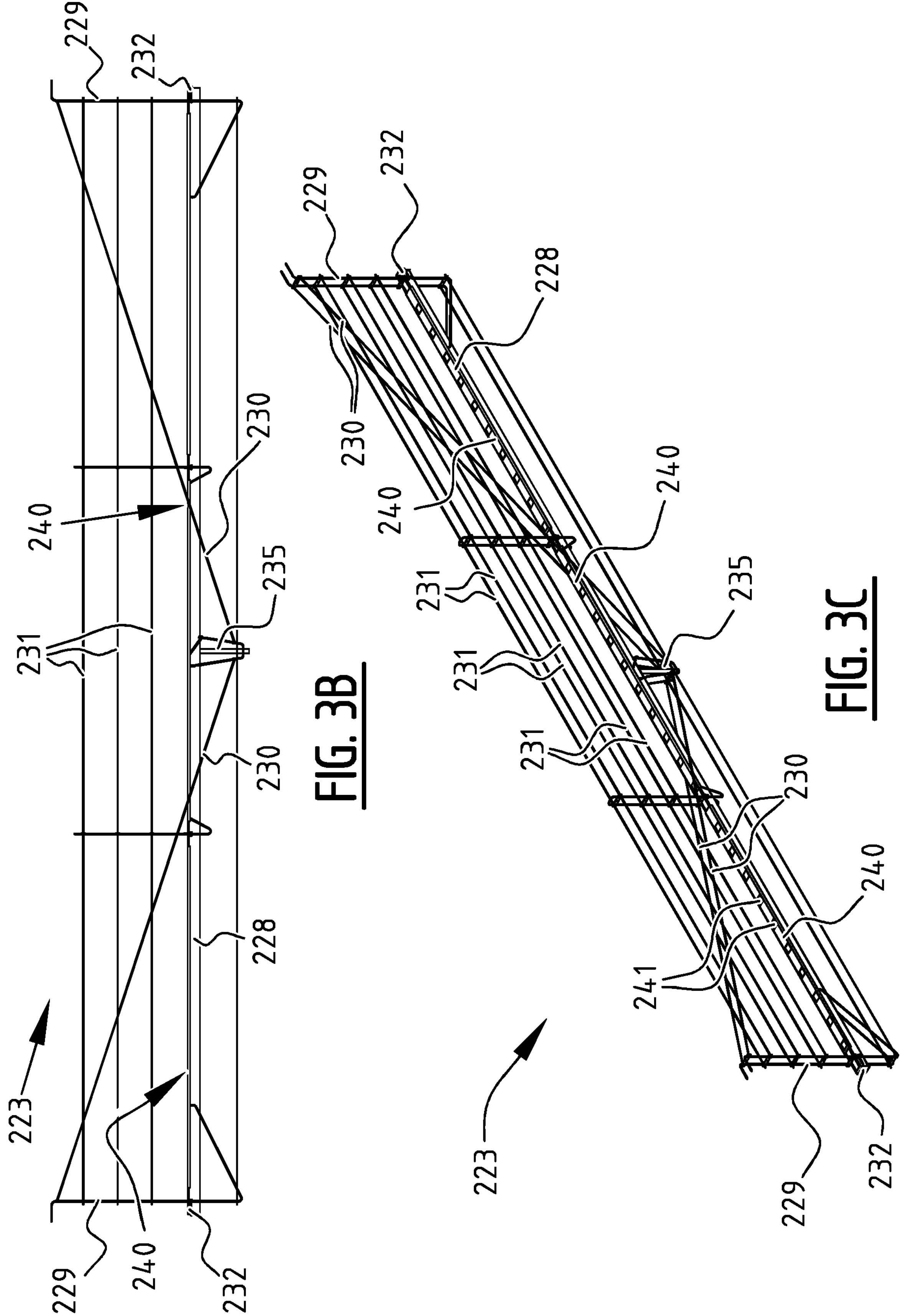
Figure 3D:
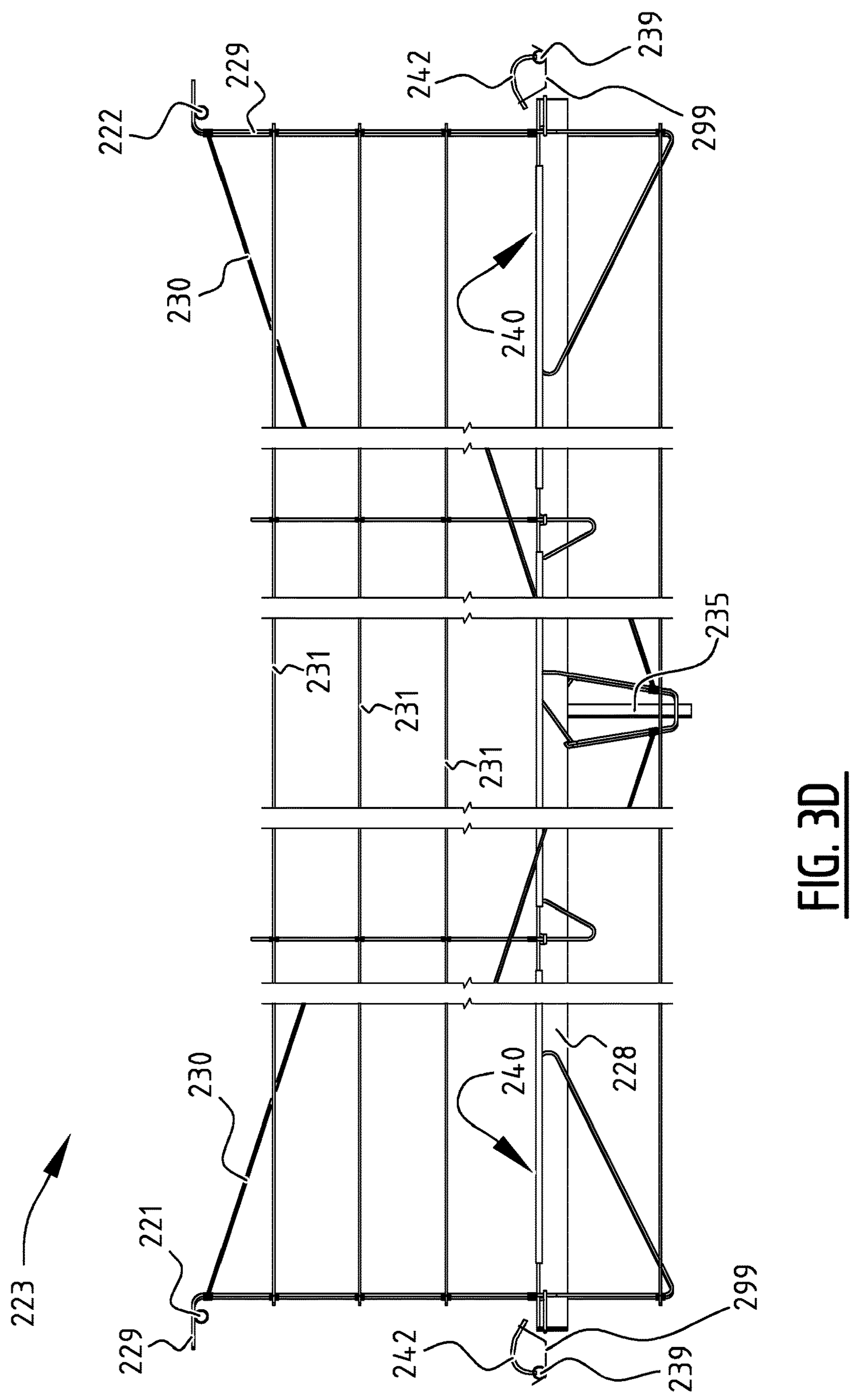

The invention will be further elucidated with referenced to the attached figures, wherein:

FIG. 1 schematically shows a perspective view of an indoor growing structure:

FIGS. 2A and 2B schematically show a top view of a plant growing system and of a row thereof:

FIG. 2C schematically shows a side view of the plant growing system of FIGS. 2A-2B FIG. 2D schematically shows a detailed top view of the plant growing system of FIGS. 2A-2C:

FIG. 3A schematically shows another plant growing system in perspective view, FIGS. 3B-3D schematically show details of the plant carriers of the plant growing system of FIG. 3A in respectively a front view, a perspective view, and a detailed front view.

Throughout the figures, like elements will be referred to using like reference numerals. Across different embodiments, like elements are referred to with like reference numerals, increased with one hundred (100). In case multiple instances of an element occur in a single figure, not all instances may be provided with reference signs for the sake of brevity and/or clarity.

FIG. 1 shows an indoor growing structure 1, which consists of a greenhouse section 2 and an operations section 3. In the greenhouse section 2, plants are grown in carriers 23, which in FIG. 1 are represented schematically by lines. The carriers 23 are arranged in rows in a row direction R. Two rows 5 of carriers 23 are shown, stacked in a columnar direction C. Only two rows 5 of carriers 23 are shown in FIG. 1 for reasons of simplicity: in practice more rows 5 will be used to more completely fill the greenhouse section 2. Details of the plant carriers 23 will be described below with reference other figures. The operations section 3 provides space for storage, personnel, and operations such as leaf picking, harvesting, monitoring, etc.

FIG. 2 shows a growing system 101, which is represented very schematically. As shown, the growing system 101 still has a greenhouse section 102 and an operations section 103. The greenhouse section 102 has been subdivided in several areas 106-110. Each section 106-110 serves a specific purpose, and as such is provided with conditions (close to)

optimal for that purpose. The purpose is determined by the needs of the plant at a specific growth stage. In the currently shown system 101, tomatoes are grown as an example. Of course, other plants could be chosen, and the greenhouse section 102 could be arranged differently for a different species. By way of example, young seeded plants are allowed to sprout in a first area 106, after which they move to a second area 107 for enhancing growth, in which they receive a relatively large amount of (sun)light, which is indicated by a sun-symbol 111. In a next area 108, which is heated as shown by a fire symbol 112, the plants are fertilized by bumblebees 113. In a next area 109, the plants are allowed to grow and develop fruits. This area 109 is kept relatively cool as indicated by frost symbol 114. In other cases another temperature may be used. As such, the specific temperature, whether cold or hot, is not relevant for the system described herein. Finally, a ripening area 110 is present, in which temperature can be varied to speed up or slow down the ripening process for matching demand, as shown by thermometer symbol 115.

Depending on the requirements of a specific plant species, different areas may be provided, and their area may be varied. However, once the greenhouse section 102 has been arranged, the areas 106-110 remain unchanged. Accordingly, plants begin in one area 106, and pass through the others 107, 108, 109, and finally arrive at the final area 110. Plants 116-120 in a similar stage of growth, therefore requiring similar conditions, are kept together in one area 106-110.

Briefly referring to FIG. 2B, which shows part of a single row 105 of the plant growing system of FIG. 2A, the way in which plants are arranged in a row is further elucidated. Each row 105 is provided with a track 104 comprising two guides 121, 122, which extend at a distance from each other parallel to the row direction R. The track 104 supports plant carriers 123, which will be described in more detail below. The plant carriers 123 extend transversally with respect to the track 104, and thus also with respect to the row 105 and the row direction R. Only some plant carriers 123 have been shown for reasons of simplicity. FIG. 2B further shows that the plant carriers 123 provide space for individual plants 124, represented herein schematically as circles. Obviously the amount of plants 124 in a plant carrier 123 can be varied. The plant carriers 123, and thus the plants 124, can be moved along the track 104, e.g. in the row direction R. It is noted that the amount of carriers 123 in a track 104 may be chosen as desired.

Referring again to FIG. 2A, it can therefore be seen how plants 124 can therefore move along the row direction R through their respective areas 106-110. In some cases, plants 124 can be moved from one area 106 to the next 107 by simply moving the plant carrier 123 along its track 104. Other areas 108-110 consist of multiple rows 105, each provided with its own track 104. Plant carriers 123 can be moved from a track 104 in one row 105, to another, if desired also to a track 104 in another area 108-110. When operations on the plants 124 are to be performed, the plants 124 can be moved in their plant carrier 123, to the operations section 103. This is shown in FIG. 2A by arrows 125. From the operations section 103, plant carriers 123 with plants 124 may be brought back to the same or a different track 104, as indicated by arrows 126. It is also possible to bypass the operations section 103 in order to move plant carriers from one track 104 to another as is shown by arrow 127. Accordingly, a looped path is created along which different tracks 104 and the operations section 103 are included. A plant carrier 123 may move along various tracks 104, and may pass the operations section 103 multiple times. In FIG. 2A the movement of the plant carriers 123 along all tracks 104 is shown in a single direction, however it is also possible to alternate the direction of movement along the tracks 104, or to reverse the direction of only some of the tracks 104 with respect to that shown in FIG. 2A. In some alternative systems, the tracks 104 could for instance be aligned with the column direction C instead of with the row direction R if desired. Thus, the direction of the tracks 104 with respect to the indoor growing environment 1 may be suitable chosen for the application at hand. It should be noted that since the plants are moved to the operations section 103, there is little need for workers to enter the greenhouse section 102. To easily place and move plants in the operations section 103, the operations section 103 can be provided with at least one track 104 similar to that described herein, for supporting the plant carriers 123. Accordingly, the operations section 103 can be used as a crop handling area, where many, almost all or all operations on plants take place, whereas the greenhouse section 102 functions as a growing area, in which there is little or no human presence.

It should be noted that the plant carriers 123 are driven to move along the track 104 by a drive system, details of which are not described herein. Moreover, plant carriers 123 are moved from one track 104 to the other by a track switching system, details of which are not described herein.

FIG. 2C shows a plant carrier 123 with plants 124, as suspended from a track 104. The track 104 runs into and out of the plain of the figure, parallel to the row direction R. FIG. 2C further shows columns 127 which are part of the greenhouse construction. It should be noted that columns 127 are unrelated to the columnar direction C. Other parts of the greenhouse construction are not shown. Alternatively, use could be made of separately provided posts. The columns 127 carry two guides 121, 122 for each track 104. The guides 121, 122 making up the track 104 extend on the sides of each row 105 in the row direction R. Existing, or altered, heating pipes could be used as guides 121, 122, however it is also possible to outfit the greenhouse section 102 with separate guides 121, 122. The guides 121, 122 extend substantially parallel to each other, at a distance from each other. From each track 104, multiple plant carriers 123 are suspended. One plant carrier 123 is visible in the side view of FIG. 2C. Each plant carrier 123 has a gutter 128 for holding plants 124. The gutter 128 is a generally u-shaped profile, which is open towards its top. The gutter 128 allows water to pass through longitudinally, and allows the roots of plants to develop inside the gutter 128. As will be shown below in relation to FIG. 3C, the top of the gutters 128 may be partly closed with a lid (not shown in FIG. 2C). The plant carriers 123 are moveable along the track 104, in casu in the row direction R. The plant carriers 123 are suspended from the track 104. As a result the gutters 128 extend at a distance below the track 104. Each plant carrier 123 comprises brackets 129, which are rigid elements, for suspending the gutters 128 below the track 104.

Diagonal braces in the form of metal cables 130 extend from the top, free end, of the brackets 129 to the center of the gutter 128, thereby providing strength to the plant carrier 123. Further, plant supports 131 extend parallel to the gutter 128 at mutually different heights, from one bracket 129 to the other 129. In the shown example, plant supports 131 consist of wires, but alternative supports could be employed. The plants 124 engage on the plant supports and thereby keep upright even under the load of e.g. trusses of fruit. The brackets 129 engage the gutter 128 at a relatively small distance from its longitudinal ends. As such, the gutter 128 extends beyond a point of engagement of the bracket, leaving ends 132 extending freely. By arranging stationary taps 133 under the guides 121, 122 of the track 104, and passing the gutters below said stationary taps 133, the gutters 128 can be provided with water and/or plant feed. A central zone 134 of the gutter 128 comprises an outlet 135, through which superfluous water and/or waste can be let out of the gutter 128. Below the central zone 134 a drain 136 is be arranged to capture the drainage for e.g. recycling purposes.

With reference to FIG. 2D, it is noted plant carriers 123 on the same track can be moved directly adjacent to each other, or at a mutual distance, which may change. FIG. 2D shows multiple plant carriers 123 arranged in the row direction R. The plant carriers 123 carry plants 124, represented herein with stars. Other parts of the plant growing system 101 and details of the plant carriers 123 are not shown. A single plant carrier 123' is shown empty, i.e. without plants 124. As an example method of growing plants 124, the empty plant carrier 123' may be moved to the operations section 103 so that young plants or seeds can be arranged therein. Then, multiple plant carriers 123 with plants 124 therein can be kept at a relatively short distance, for instance in a first area 106, or in a particular segment 137 of a row 105. Later, the same plant carriers 123 can be spaced with a larger distance in between, in order to provide more room for the plants 124 contained therein. It is likely the larger spacing will be provided in another segment 138 of the row 105, or in another area 107-110. The desired distance between plant carriers 123 can for instance be set by the drive means driving the plant carriers 123, or by placing spacer members 139 in between the plant carriers 123.

FIGS. 3A-3D show another plant growing system 201, in more detail. Save for some details, only differences between the plant growing systems 201 with respect to that of FIGS. 2A-2D are described herein. In the overview of FIG. 3A, multiple plant carriers 223 are shown suspended from a track made up by two guides 221, 222. Below the guides 221, 222 stationary water conduits 239 are provided which can be used to provide water to the gutters 228. The plant carriers 223 are described in more detail with reference to FIGS. 3B-3D.

The plant carriers 223 comprise a metal wire frame, for instance made of rigid steel wires. The wire frame forms brackets 229 on longitudinal ends of the frame. The brackets 229 support a gutter 228 near the longitudinal ends thereof. The gutter 228 extends beyond a point of engagement of the brackets 229. The brackets 229 suspend the gutter 228 at a distance below the guides 221, 222 of the track. Between the brackets, plant supports 231 are provided for supporting plants. The plant supports 231 are arranged on either long side of the plant carrier 223 in order to distribute forces evenly. Similarly, diagonal braces 230, which in this case are steel wires 230 but could be replaced by cables, extend on both long sides from a top free end of the brackets 229 to a central zone of the plant carrier 223. The brackets 229 and diagonal braces 230 extend below the gutter 228 in order to provide further structural rigidity. The gutter 228 can be made of a relatively light materials, both in terms of weight and in terms of structural capabilities, such as relatively thin steel sheet or plastics.

The gutter 228 is partly sealed with a number of lids 240. The lids 240 leave free the longitudinal ends 232 of the gutter 228, so that an inlet is created for water. Further, the lids 240 have through holes 241 at a distance from each other. Plants can extend through the through holes 241, are kept in position by them. For the purpose of this application, multiple lids may be replaced by a single lid and vice versa.

In FIG. 3D, where intermediate parts of the plant carrier 223 have been omitted, a method of providing water can be seen more clearly. The conduits 239 are shown carried by a longitudinal support 299, and are provided with a dosing system 242 capable of providing water and/or plant feed at a suitable rate.

Although the invention has been described herein with reference to specific examples and embodiments, the invention is not limited thereto. In fact, the invention is also covered by the scope of the claims, which now follow.

The invention claimed is:

1. A plant growing system for growing vertically grown plants, the system comprising:

at least one substantially horizontal track, comprising at least two guides extending substantially horizontally and substantially parallel at a distance from each other; and a plurality of plant carriers, each comprising a gutter for holding plants, the plant carriers extending transversally with respect to the track, the plant carriers being movable along the track and the at least two guides, wherein the plant carriers are suspended from the at least two guides; and wherein optionally the gutters extend at distance below the track;

wherein each plant carrier further comprises, on or near either end thereof, a rigid suspension element, for suspending the gutter from a respective one of the at least two guides; and wherein each carrier further comprises one or more supports which extend between the rigid suspension elements at a distance above the gutter, optionally at mutually different heights.

2. The plant growing system according to claim 1, wherein each plant carrier further comprises one or more diagonal braces extending between a respective free end zone of the rigid suspension element and a central zone of the gutter; and wherein the plant growing system optionally comprises one or more diagonal braces extending along opposite long sides of each plant carrier.

3. The plant growing system according to claim 1, wherein the gutter of each plant carrier comprises two longitudinal ends, and further comprises a water inlet near one or both of said longitudinal ends; and wherein optionally each gutter extends, at at least one longitudinal end thereof, beyond a corresponding suspension element.

4. The plant growing system according to claim 1, wherein the gutter of each plant carrier comprises a lid substantially closing the gutter, the lid being provided with through holes along its length.

5. The plant growing system according to claim 1, wherein the gutter of each plant carrier comprises at least one water outlet in a central zone as seen along its length.

6. The plant growing system according to claim 1, wherein the gutter of each plant carrier comprises several spacers for maintaining a mutual distance between plants in the gutter.

7. The plant growing system according to claim 1, further comprising several tracks arranged in parallel; and optionally further comprising:

a track switching system for moving plant carriers from one track to another; and/or a climate control system, said climate control system being configured to provide a first controlled climate along a first track, and a different, second controlled climate along the second track.

8. The plant growing system according to claim 7, comprising a crop handling area and a growing area, wherein at least one track is arranged in the crop handling area and at least one track is arranged in the growing area.

9. The plant growing system according to claim 1, wherein the plant growing system is an indoor plant growing system, optionally a greenhouse plant growing system.

10. The plant growing system according to claim 1, further comprising a drive for driving the plant carriers along the at least one track, and wherein optionally the drive is configured for changing the distance between consecutive plant carriers.

11. A plant carrier for use in a plant growing system according to claim 1.

12. A method of growing vertically grown plants, the method comprising:

a) providing plants in gutters of plant carriers;

b) moving the plant carriers along at least one substantially horizontal track, wherein step b) comprises suspending the plant carriers from the at least one substantially horizontal track; and c) draining water at or near a central zone of each gutter.

13. The method according to claim 12, further comprising:

growing the plants in a growing area, and performing operations, optionally exclusively, in a crop handling area; and optionally further comprising:

circulating the plant carriers between the growing area and the crop handling area.

14. The method according to claim 12, further comprising:

providing several tracks with gutters with plants; and controlling a climate of an environment in which the method is performed differently from one track to another.

15. The method according to a claim 12, further comprising:

changing a distance between consecutive plant carriers.

16. The method according to claim 12, further comprising:

watering the plants by supplying water to the gutters at or near one or both of its longitudinal ends.

17. The method according to claim 12, wherein the method is a method of growing vertically grown plants of the fruit bearing type.

18. A plant growing system for growing vertically grown plants, the system comprising:

at least one substantially horizontal track, comprising at least two guides extending substantially horizontally and substantially parallel at a distance from each other; and a plurality of plant carriers, each comprising a gutter for holding plants, the plant carriers extending transversally with respect to the track, the plant carriers being movable along the track and the at least two guides, wherein the plant carriers are suspended from the at least two guides;

wherein optionally the gutters extend at distance below the track;

wherein each plant carrier further comprises, on or near either end thereof, a rigid suspension element, for suspending the gutter from a respective one of the at least two guides;

wherein each plant carrier further comprises one or more diagonal braces, extending between a respective free end zone of the rigid suspension element and a central zone of the gutter; and wherein the plant growing system optionally comprises one or more diagonal braces extending along opposite long sides of each plant carrier.

* * * * *